United States Patent
Tilkes et al.

(10) Patent No.: US 9,347,844 B2
(45) Date of Patent: May 24, 2016

(54) THREE POINT HITCH DRAFT SENSING SYSTEM

(71) Applicant: Deere & Company, Moline, IL (US)

(72) Inventors: Andrew M. Tilkes, Cedar Falls, IA (US); Benjamin J. Heimbuch, Cedar Falls, IA (US); Edwin R. Kreis, Waterloo, IA (US); Mark S. Earley, Traer, IA (US); Dennis A. Bowman, Denver, IA (US); Jonathan T. Roth, Cedar Falls, IA (US); Douglas R. Fischer, Dike, IA (US); Michael D. Kollath, Reinbeck, IA (US)

(73) Assignee: DEERE & COMPANY, Moline, IL (US)

( * ) Notice: Subject to any disclaimer, the term of this patent is extended or adjusted under 35 U.S.C. 154(b) by 69 days.

(21) Appl. No.: 14/135,163

(22) Filed: Dec. 19, 2013

(65) Prior Publication Data

US 2015/0177086 A1    Jun. 25, 2015

(51) Int. Cl.

| A01B 63/112 | (2006.01) |
| G01L 5/13 | (2006.01) |
| A01B 76/00 | (2006.01) |
| A01B 59/06 | (2006.01) |
| G01D 5/14 | (2006.01) |
| B60D 1/14 | (2006.01) |
| B60D 1/24 | (2006.01) |
| B60D 1/46 | (2006.01) |
| B60D 1/52 | (2006.01) |
| B60D 1/00 | (2006.01) |

(52) U.S. Cl.
CPC ............... *G01L 5/136* (2013.01); *A01B 59/066* (2013.01); *A01B 63/112* (2013.01); *A01B 76/00* (2013.01); *B60D 1/141* (2013.01); *B60D 1/246* (2013.01); *B60D 1/247* (2013.01); *B60D 1/465* (2013.01); *B60D 1/52* (2013.01); *G01D 5/14* (2013.01); *B60D 2001/008* (2013.01)

(58) Field of Classification Search
CPC .. A01B 63/112; A01B 59/041; A01B 59/066; A01B 76/00; B60D 2001/008; B60D 1/141; B60D 1/246; B60D 1/247; B60D 1/465; B60D 1/52; G01D 5/14; G01L 5/136
See application file for complete search history.

(56) References Cited

U.S. PATENT DOCUMENTS

| 3,342,274 | A | * | 9/1967 | Wridt, Jr. | 172/7 |
| 3,375,876 | A | * | 4/1968 | Engelmann | 172/1 |
| 3,527,305 | A | * | 9/1970 | Dollase | 172/7 |
| 4,059,159 | A | * | 11/1977 | Moorhouse et al. | 172/7 |
| 4,142,733 | A | * | 3/1979 | Bernini | 172/7 |

(Continued)

OTHER PUBLICATIONS

German Search Report issued in counterpart application No. 14196738.0 dated Jun. 15, 2015 (5 pages).

*Primary Examiner* — Matthew D Troutman
*Assistant Examiner* — Adam Behrens

(57) ABSTRACT

A draft sensing mechanism for a three point hitch includes a hitch frame attached to a frame of a vehicle. The hitch frame includes left and right link supports for coupling to left and right draft links and left and right draft bars. Each draft bar has a first portion attached to a corresponding one of the link supports, and a second portion positioned rearwardly and inwardly with respect to its first portion. Draft forces applied by the draft links to the link supports are transmitted to the second portions of the draft bars. A linkage unit sums the draft forces from the draft bars and includes a draft force transducer which generates a draft force signal in response to deflection of the draft bars.

11 Claims, 9 Drawing Sheets

(56) References Cited

U.S. PATENT DOCUMENTS

| | | | |
|---|---|---|---|
| 4,206,813 A * | 6/1980 | Mueller et al. | 172/7 |
| 4,266,616 A * | 5/1981 | Mueller, Jr. | 172/7 |
| 4,422,341 A * | 12/1983 | Espiritu Santo et al. | 73/862.626 |
| 4,425,970 A * | 1/1984 | Dwyer et al. | 172/7 |
| 4,510,814 A * | 4/1985 | Espiritu Santo et al. | 73/862.57 |
| 5,042,586 A * | 8/1991 | Spencer et al. | 172/7 |
| 5,101,909 A | 4/1992 | VanGerpen | |
| 5,109,707 A | 5/1992 | VanGerpen | |
| 5,190,111 A * | 3/1993 | Young et al. | 172/7 |
| 5,320,186 A * | 6/1994 | Strosser et al. | 172/8 |
| 5,452,766 A * | 9/1995 | Imamura et al. | 172/7 |
| 7,454,979 B2 * | 11/2008 | Frank et al. | 73/779 |
| 8,496,068 B1 * | 7/2013 | Kosmicki et al. | 172/7 |

* cited by examiner

THREE POINT HITCH DRAFT SENSING SYSTEM

FIELD

The present disclosure relates to a draft force sensing system.

BACKGROUND

Agricultural implements can be mounted directly to agricultural tractors using a conventional three point hitch. Three point hitches have been controlled by a hitch control system which raises and lowers the hitch in response to a number of sensed parameters, including sensed draft force. Such systems can operate to lower and raise an implement while maintaining a constant load on the tractor. The implement is actually able to work at a deeper average depth as the tractor is able to operate at a higher average power with this control system. Various draft force sensing systems have been developed to provide a sensed draft force signal. Certain current production draft force sensing systems have a number of moving parts that require periodical maintenance, including removing mud and dirt accumulation and lubrication of a draft sensor plunger to prevent moisture and dirt contamination. In certain conditions, the dirt and mud accumulation actually prevents component movement which causes false draft sensing signals. Changes in tractor frame design will require new draft force sensing designs.

Some production systems have costly draft sensing pins, bending bars, and draft sensing shafts. Draft sensing pins require two instrument pins which double the cost and halve the reliability. The bending bar and draft sensing shaft systems have moving parts and require a sealed compartment and a fair amount of space. The zero load voltage for the system is set by adjusting the length of a spring steel strap that mounts over the sensor plunger and the ends of which are attached to the body of the shaft. The factory consistently has issues setting the voltage. The spring steel strap and sensor plunger produce an inconsistent voltage during spring steel strap adjustment. The current draft sensing system on 4WD tractors measures the deflection between the draft link mount straps. The components are open to the elements and exposed to mud, dirt, and debris.

It is desired to provide a draft force sensing system which can be installed within the space available in future production tractors. It is also desired to provide a draft force sensing system which is better protected from environmental contamination. It is desired to have a system which is sealed and less prone to accumulate debris.

SUMMARY

According to an aspect of the present disclosure, a vehicle includes left and right draft links for coupling an implement to a hitch frame. A draft force sensing system includes a pair of L-bars coupled between the draft links and a sensing unit. The sensing unit includes a housing and first and second spaced apart pivot pins mounted in the housing. A first arm is pivotally mounted on the first pivot pin. The first arm has an first portion movable by one of the L-bars in response to draft force applied to the left draft link and has a second portion. A second arm is pivotally mounted on the second pivot pin. The second arm has an first portion movable by the other L-bar in response to draft force applied to the right draft link and has a second portion. A resilient member is coupled to the first and second arms and is biased to urge the arms towards each other. A stop member is positioned between the arms and is engagable with the arms to limit movement of the arms towards each other. A transducer engages the second portions of the first and second arms. The transducer generates an electrical signal representing a distance between the second portions.

This draft force sensing system mechanically sums the horizontal draft load between the two lower draft links of a three point hitch. The two lower draft links are coupled to parts of a hitch frame which are flexible in response to horizontal loads and is stiff in response to vertical loads. The hitch frame structure and L-bar placement maximizes the horizontal draft signal and minimizes vertical load signal. The draft sensing system requires very little space and does not require periodical lubrication and maintenance. The hitch frame is a casting which deflects in response to draft load. This deflection is transferred to the two L-bars mounted on the hitch frame. The L-bars have ends which swing due to deflection and twisting of the hitch frame. The L-bar ends push against two round headed bolts which are connected to a linkage assembly in the sensing unit. The linkage assembly includes pivoting arms which magnify the deflection. The transducer is mounted between the arms, and is compressed or decompressed depending upon the draft load applied to the hitch frame. This system mechanically sums the draft load from both lower draft link together, so that only a single transducer is required, thus increasing system reliability.

DETAILED DESCRIPTION OF THE DRAWINGS

Figure 1:
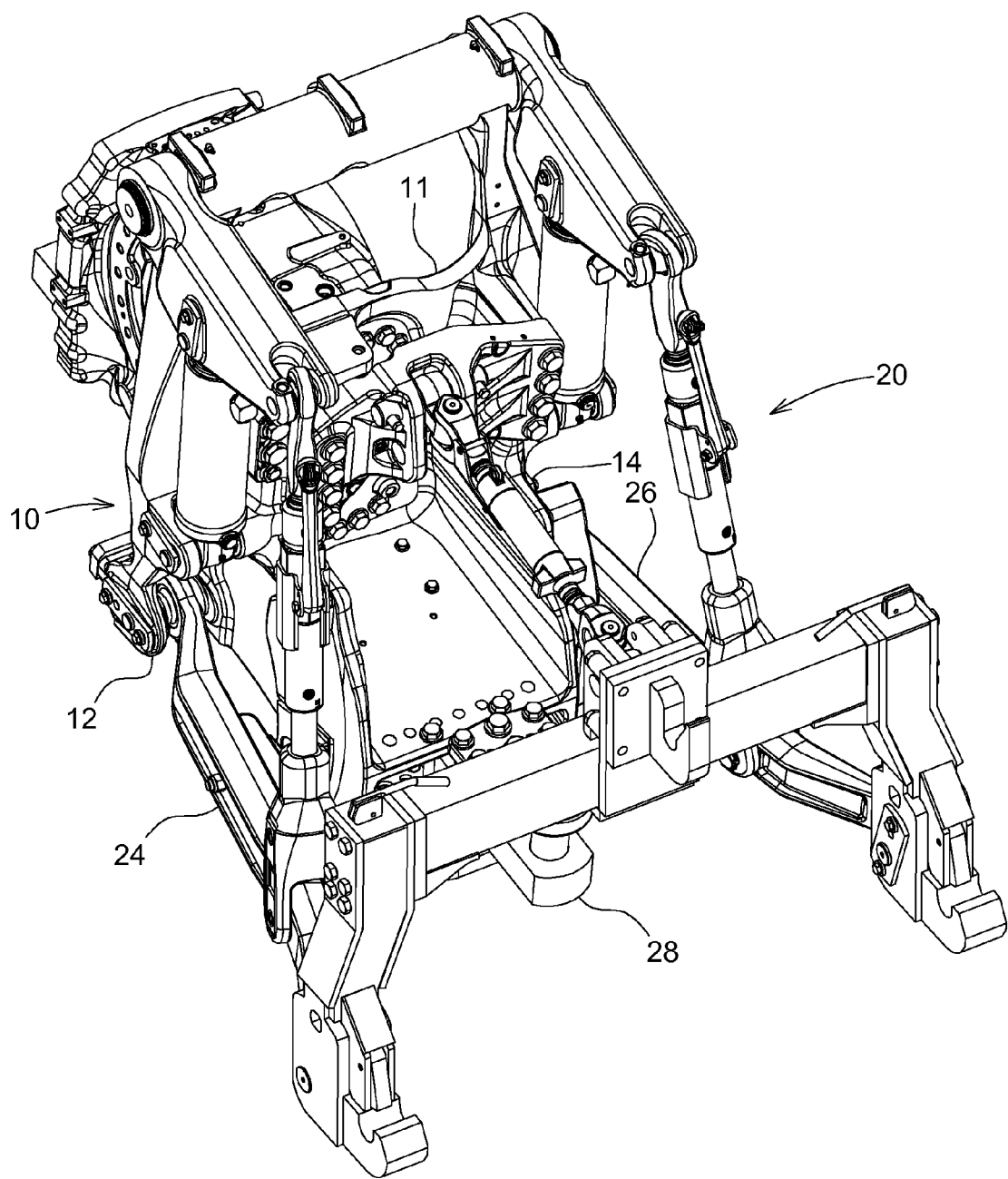
FIG. 1 is a perspective rear view of a tractor hitch frame and a three point hitch.
Figure 2:
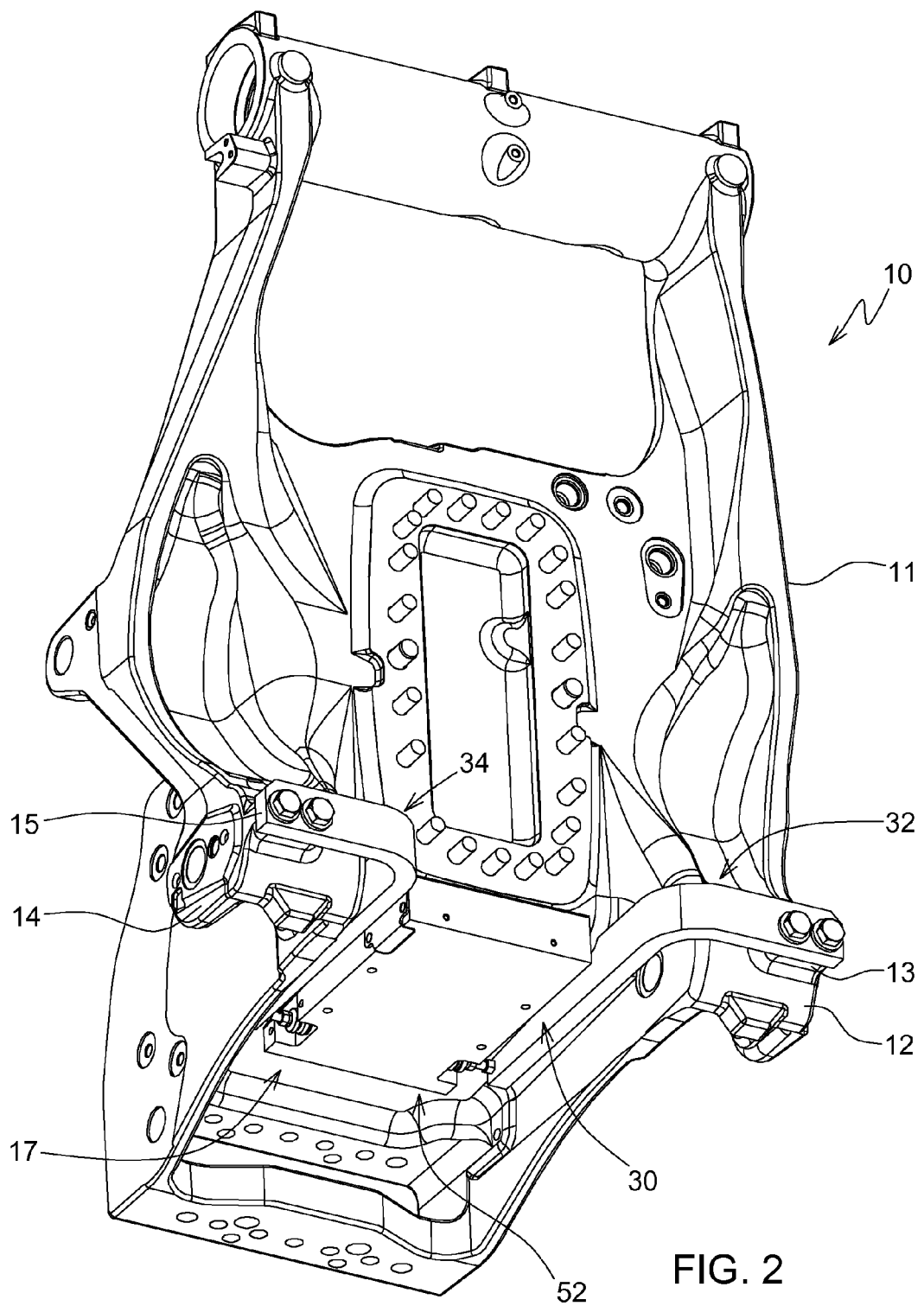
FIG. 2 is a perspective bottom front view of a tractor hitch frame and a draft sensing mechanism embodying the invention.
Figure 3:
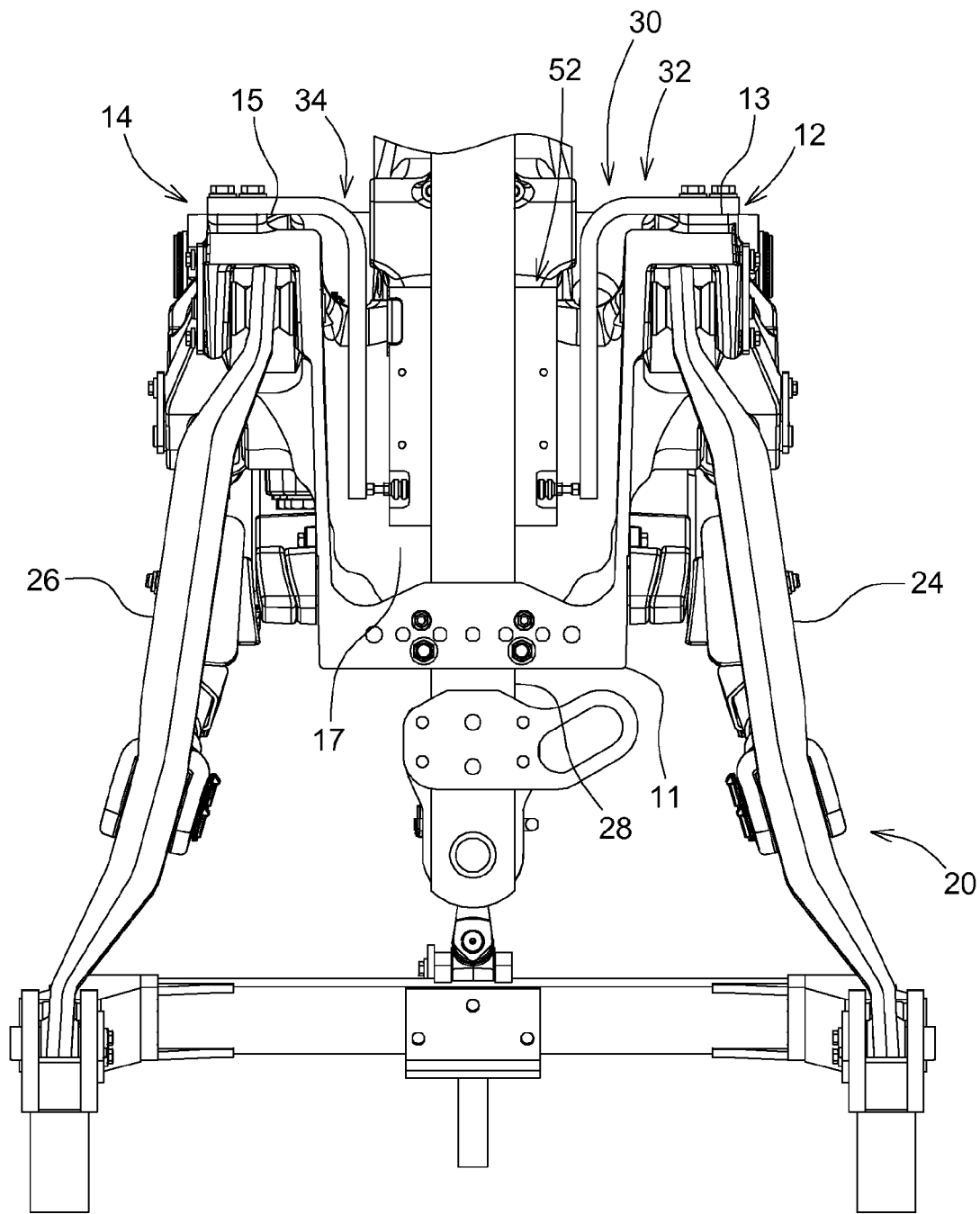
FIG. 3 is a bottom view of the structure shown in FIG. 1.

Referring to FIGS. 1, 2 and 3, a hitch frame 10 is adapted to be attached to a rear end frame of a work vehicle, such as an agricultural tractor (not shown). The hitch frame 10 includes a main body 11 and left and right draft link supports or draft ears 12 and 14. A conventional three point hitch 20 is mounted to the hitch frame 10, and includes left and right draft links 24 and 26 which are coupled to the draft ears 12 and 14 in a known manner. A conventional drawbar 28 extends in a fore-and-aft direction below the hitch frame 10.

Figure 2A:
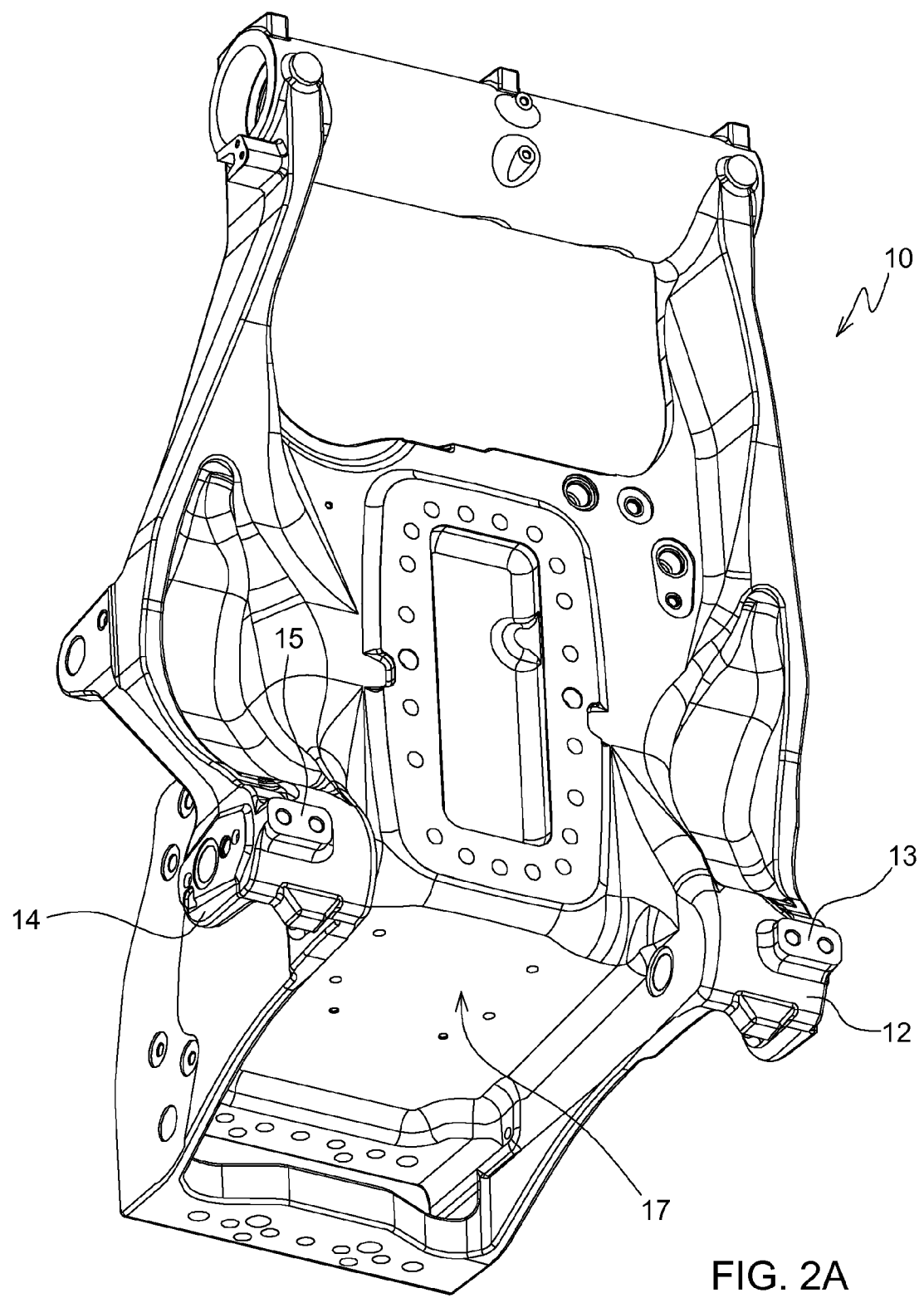
FIG. 2A is a perspective bottom front view of a tractor hitch frame with the draft sensing mechanism removed.
Figure 4:
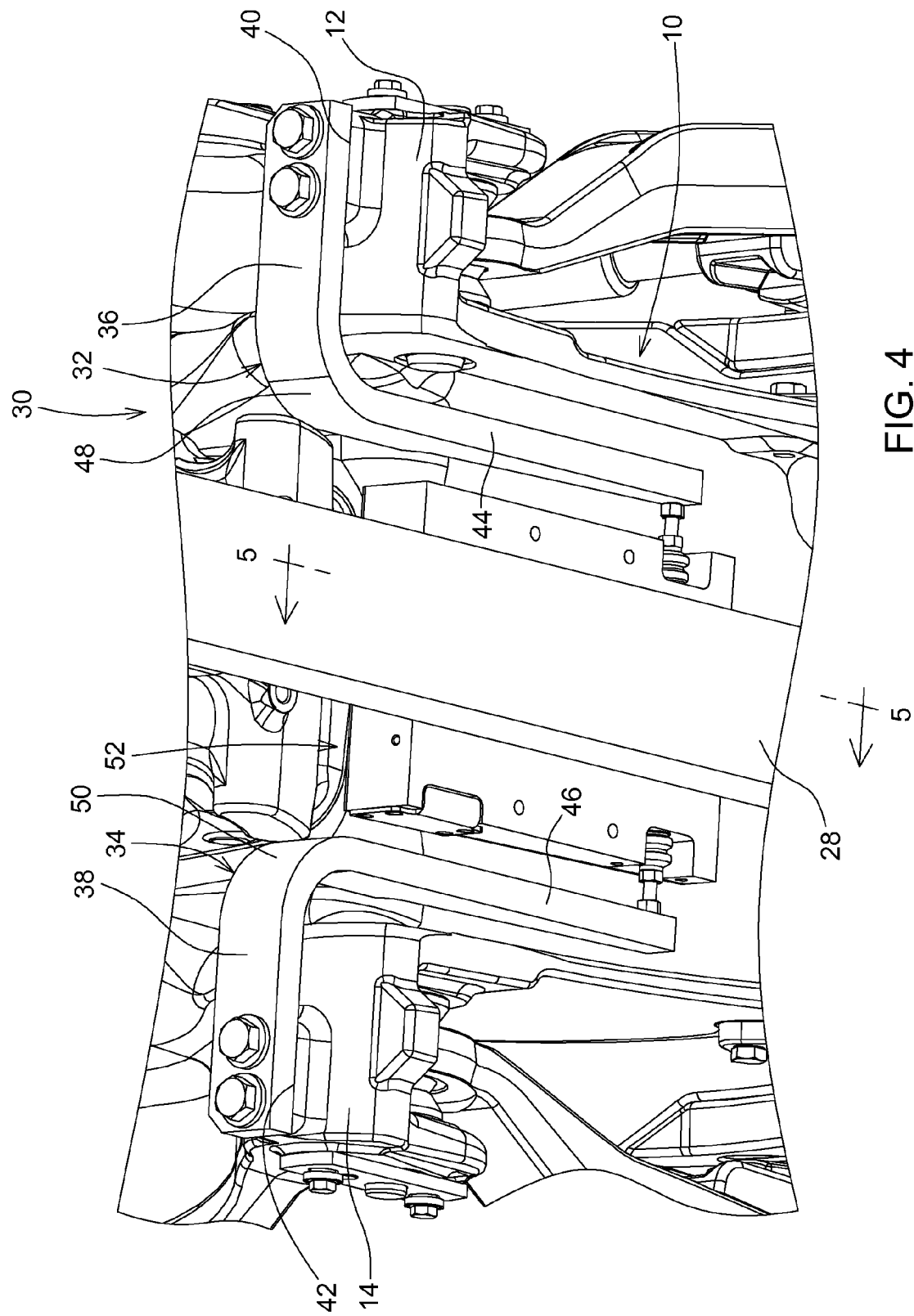
FIG. 4 is a bottom perspective view of a portion of FIG. 4.

Referring now to FIG. 2A, each draft ear 12 and 14 of the hitch frame 10 includes a corresponding forwardly facing mounting surface 13 and 15. The Hitch frame 10 forms a downwardly opening pocket 17 which extends rearwardly with respect to the draft ears 12 and 13. Referring now to FIGS. 2-4, a draft sensing mechanism 30 senses draft forces which are applied to the draft links 24 and 26, and generates an electrical draft force signal. Mechanism 30 includes left and right L-shaped draft bars 32 and 34. Each draft bar 32, 34 includes a first or forward part 36, 38 which is attached to the mounting surface 13, 15 of a corresponding one of the link supports 12, 14. Each draft bar 32, 34 also has a second part 44, 46 positioned rearwardly and inwardly with respect to the corresponding first part 36, 38. The first parts 36, 38 project laterally outwardly and away from each other. Each second part 44, 46 extends rearwardly from an inner end of the corresponding first part, 36, 38. Each first part 36, 38 is joined to the second part 44, 46 by a corresponding curved joint 48, 50.

Figure 5:
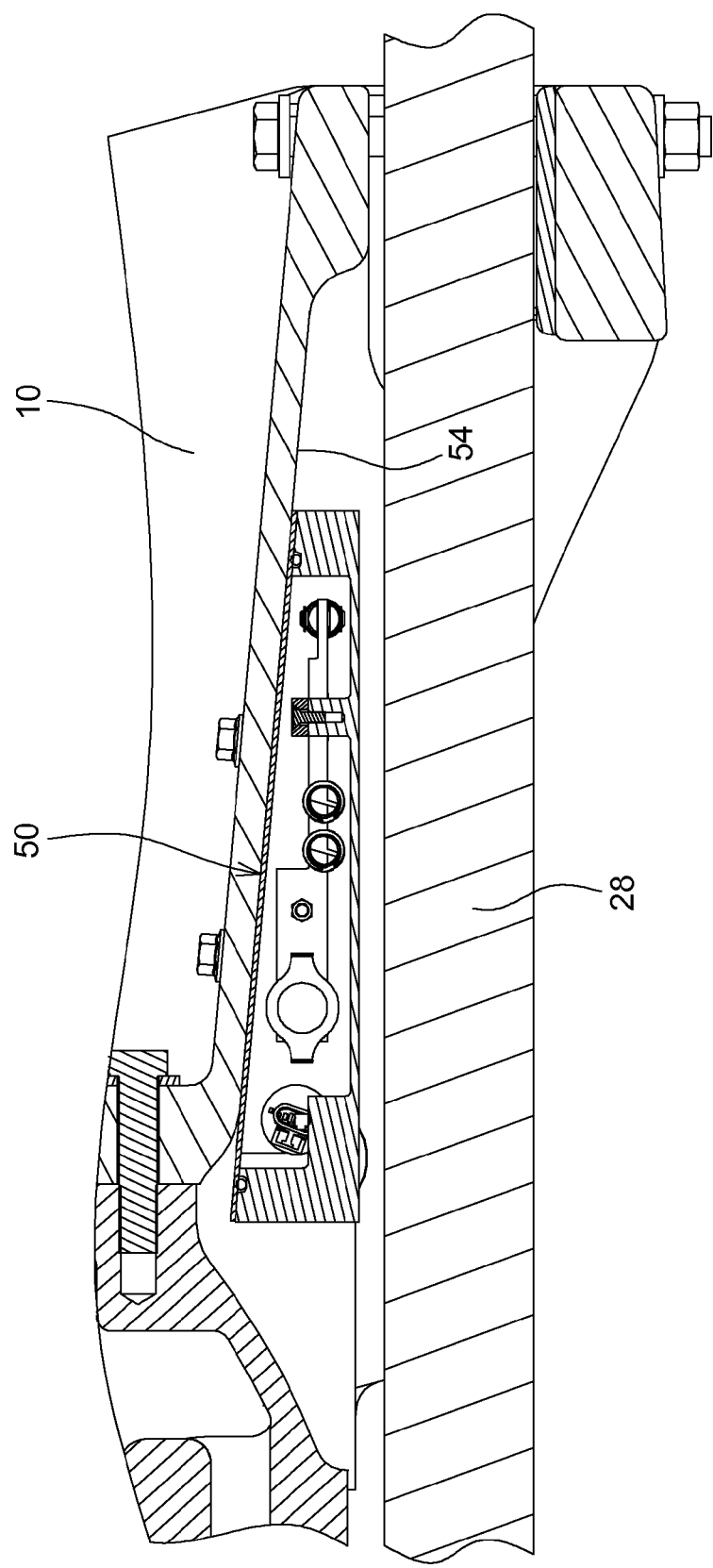
FIG. 5 is a sectional view along lines 5-5 of FIG. 4.

Referring now to FIGS. 3-5, a sensing unit or linkage unit 52 is mounted in the pocket 17 and is attached to a downwardly facing surface 54 of the hitch frame 10 between the draft bars 32 and 34 and between the drawbar 28 and the hitch frame 10.

Figure 6:
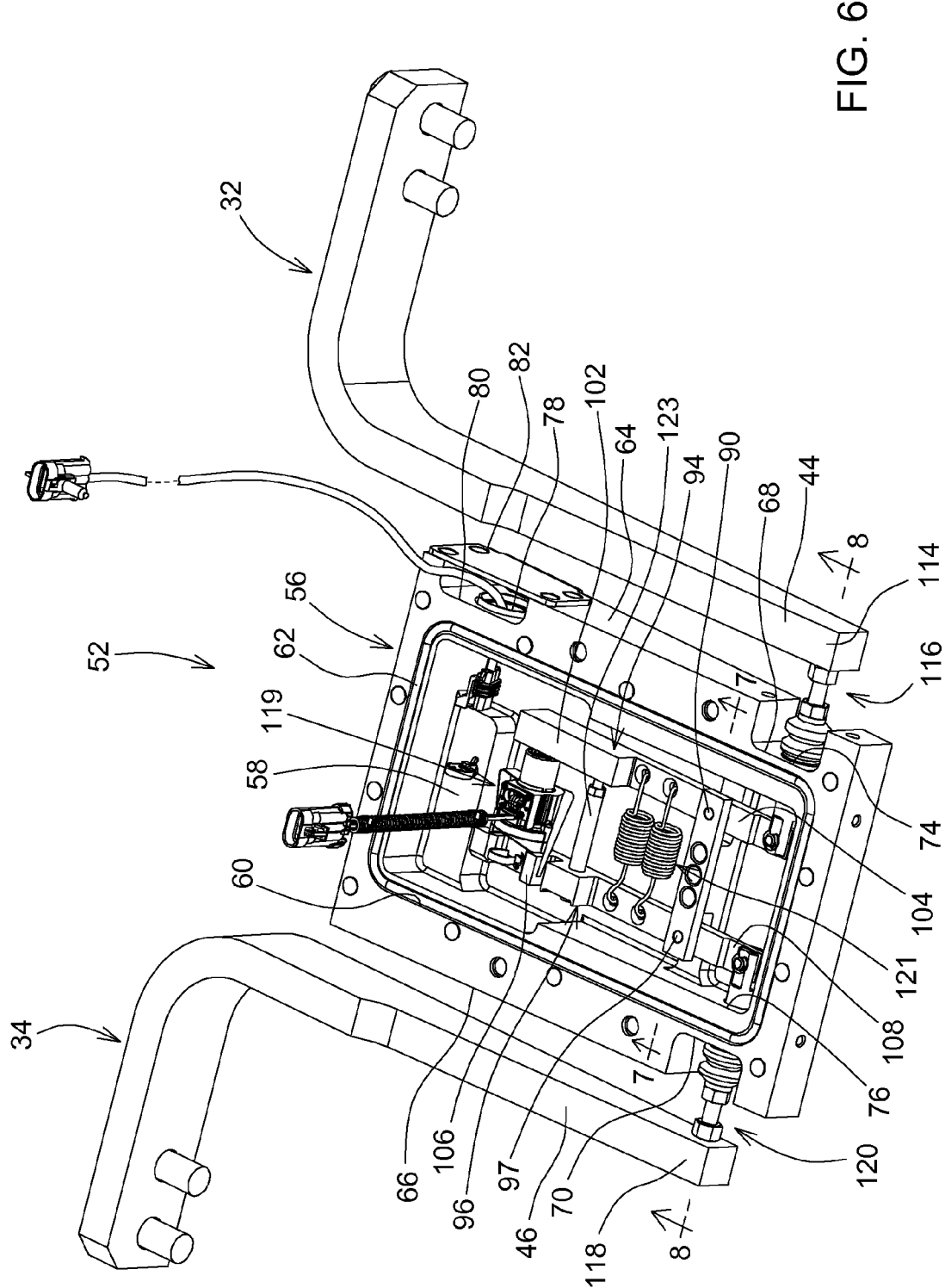
FIG. 6 is perspective view of a portion of the components shown in FIG. 3, but with the drawbar and a housing cover removed for clarity.

Referring now to FIG. 6, the sensing unit 52 includes a housing 56 which forms a cavity 58. Cavity is surrounded by a seal groove 60 which receives a seal 62. The housing forms a left side wall 64 and a right side wall 66. A left recess 68 is formed in the left side wall 64, and a right recess 70 is formed in the right side wall 66. Both recess 68 and 70 are near but spaced apart from a rear end of the housing 56. A left bore 74 communicates the cavity 58 with the left recess 68, and a right bore 76 communicates the cavity 58 with the right recess 70. A harness bore 78 communicates the cavity 58 with a harness recess 80 which is formed in the left side wall 64 near a forward end of the housing 56. Recess 80 is covered by a harness shield 82.

Figure 7:
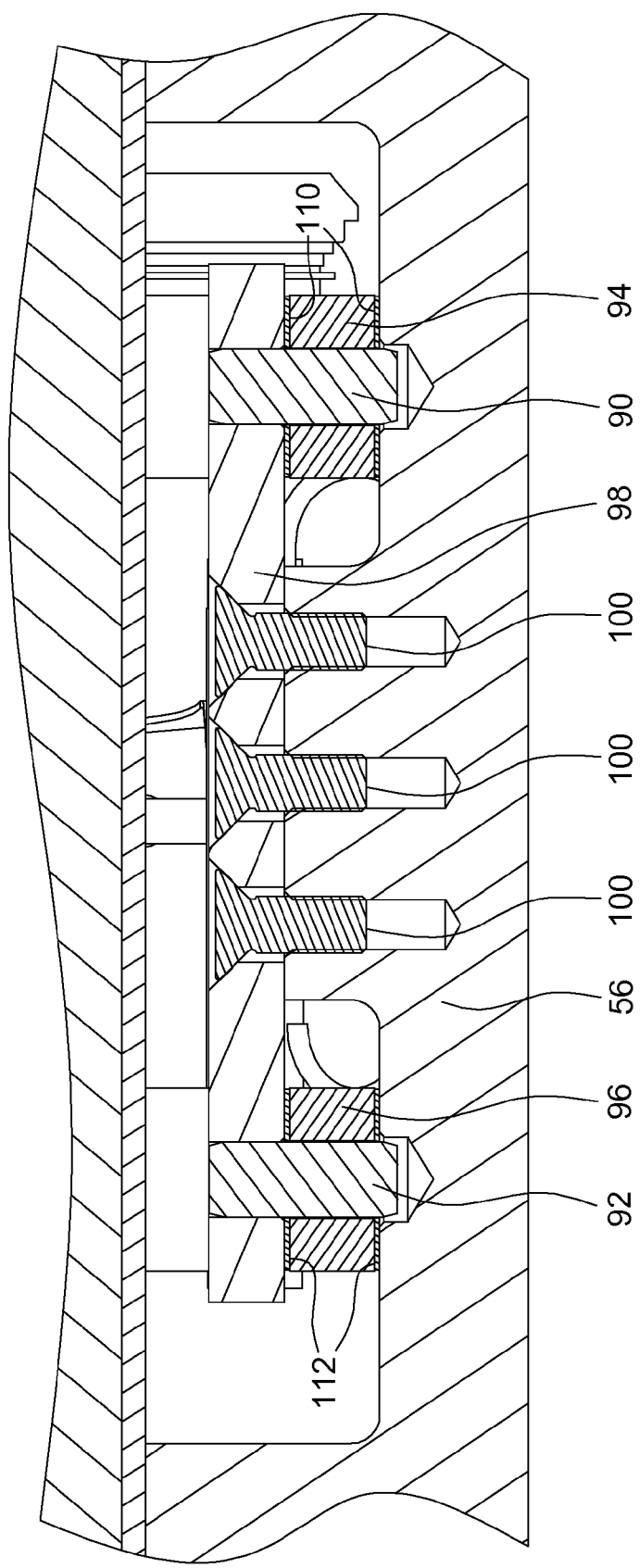
FIG. 7 is a sectional view along lines 7-7 of FIG. 6.
Figure 8:
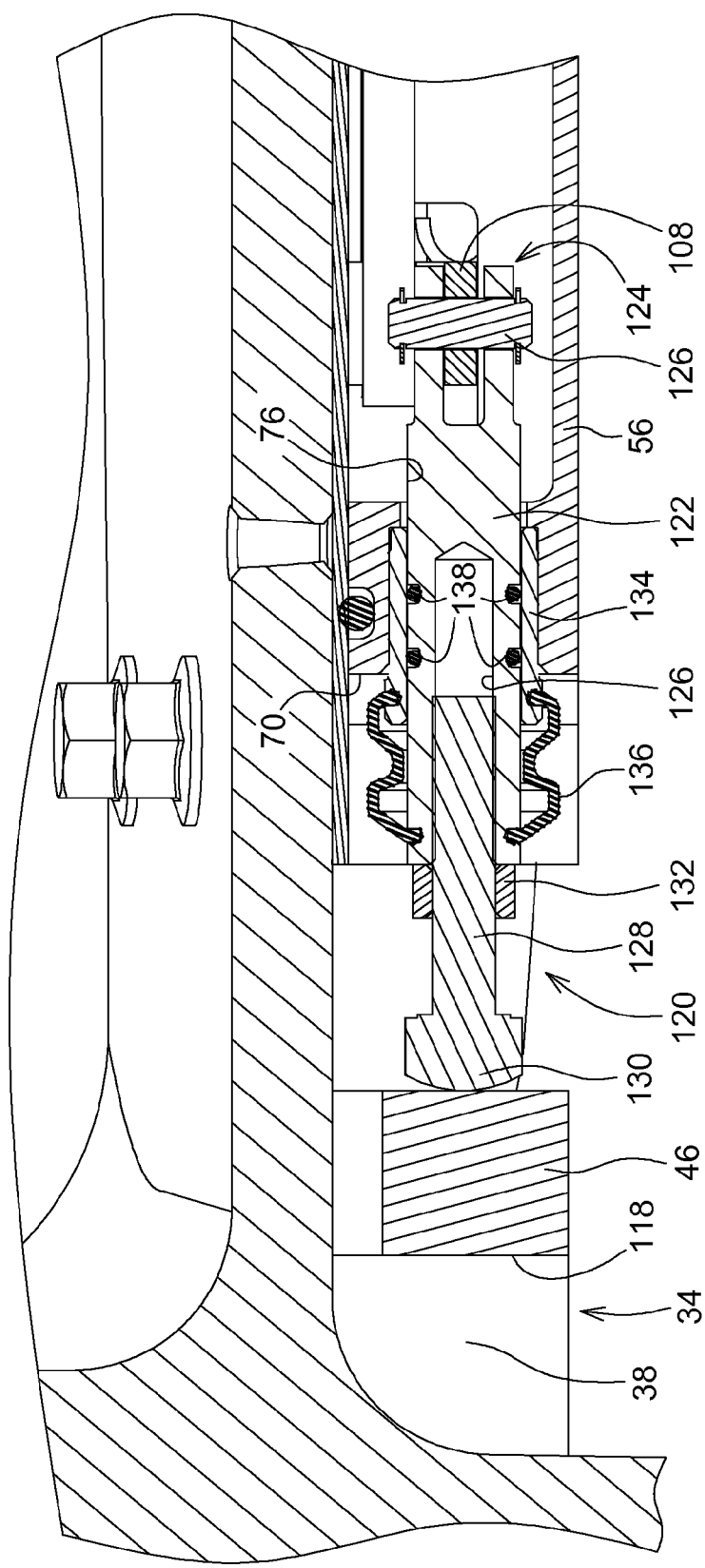
FIG. 8 is a sectional view along lines 8-8 of FIG. 6.

Referring now to FIGS. 6, 7 and 8, the sensing unit 52 also includes a pair of laterally spaced apart pivot pins 90 and 92 which are press-fit into bores in the housing 56. Left and right sensing arms 94 and 96 are pivotally mounted on the corresponding pivot pins 90 and 92. A bracing bar 98 receives both pins 90 and 92 and is bolted to the housing 56 by three bolts 100. Pivot pin 90 divides left arm 94 into a longer arm portion 102 and a shorter arm portion 104. Pivot pin 92 divides right arm 96 into a longer arm portion 106 and a shorter arm portion 108. Washers 110 are placed on pin 90 on both sides of arm 94, and washers 112 are placed on pin 92 on both sides of arm 96. Left short arm portion 104 is coupled to an end 114 of draft bar 32 by left sensing link 116. Right short arm portion 108 is coupled to an end 118 of draft bar 34 by right sensing link 120. The longer second portions 102, 106 of the arms 94, 96 engage the ends of a linear displacement transducer 119. The longer second portions 102, 106 of the arms 94, 96 move away from each other and disengage from the transducer 119 when draft force exceeds a threshold.

A resilient member 121 includes a pair of coil springs and is coupled to the longer portions 102, 106 of the first and second arms 94, 96, and is biased to urge the longer portions 102, 106 towards each other. A stop member 123 positioned between the longer portions 102, 106 and is engagable with the longer portions 102, 106 to limit movement of the longer portions 102, 106 towards each other.

The sensing links 116 and 120 extend transversely with respect to the fore-and-aft direction. The linear displacement transducer 119 has a first end coupled to longer arm portion 102 and a second end coupled to longer arm portion 106. Transducer 119 generates an electrical draft force signal, since the deflection of the sensing arms 94 and 96 is a function of the draft force applied to draft ears 12 and 14. Thus, the sensing unit 52 mechanically sums deflection of the second portions 44, 46 of the draft bars 32, 34 and applies the summed deflection to the transducer 119. The second portions 44, 46 move away from each other and disengage from the sensing links 116, 120 when draft force is less than a threshold.

Referring now to FIG. 8, right sensing link 120 includes a stainless steel rod 122 which has a forked end 124 which is pivotally coupled to right short arm portion 108 by a pivot pin 126. Rod 122 includes a threaded central axial bore 126 which receives a threaded bolt 128 which has a head 130 which engages the end 118 of draft bar 34. A backup nut 132 is threaded onto bolt 128 to hold bolt 128 in a proper position relative to rod 122. A hollow bronze bushing 134 is received in housing bore 76 and the rod 122 is slidably received by the bushing 134. A bellows seal 136 has an inner end attached to the bushing 134 and an outer end attached to an outer end of the rod 122. A pair of O-ring seals 136 are mounted in grooves in the outer surface of rod 122 and provide a seal between the rod 122 and the bushing 134. Sensing link 116 is a mirror image of link 120.

Viewing FIG. 6, an increase in substantially rearwardly directed draft forces will bend the draft ears 12 and 14 and cause the ends 114 and 118 of the draft bars 32 and 34 to move inwardly and towards each other. This causes the longer portions 102 and 106 of arms 94 and 96 to move away from each other and increase the length of the transducer 119. In fact, if the draft forces exceed a high threshold, the longer portions 102 and 106 will disengage from the transducer 119 and thereby protect the transducer 119 from draft force overloads.

Also viewing FIG. 6, a decrease in draft forces (or a forwardly directed draft force) will cause the ends 114 and 118 of the draft bars 32 and 34 to move outwardly and away from each other. This causes the longer portions 102 and 106 of arms 94 and 96 to move towards each other and decrease the length of the transducer 119. In fact, if the draft forces are less than a low threshold, the ends 114 and 118 will disengage the bolt heads 130 of the sensor links 116 and 120, and thereby protect the transducer 119 from draft force underloads.

The result is a draft sensing system which is compact and which has a housing which protects critical parts from dirt accumulation.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. In a vehicle having left and right draft links for coupling an implement to a hitch frame, a draft force sensing system comprising:

a housing;

first and second spaced apart pivot pins mounted in the housing;

a first arm pivotally mounted on the first pivot pin, the first arm having a first portion movable in response to draft force applied to the left draft link and having a second portion, the first pivot pin being positioned between the first and second portions of the first arm;

a second arm pivotally mounted on the second pivot pin, the second arm having a first portion movable in response to draft force applied to the right draft link and having a second portion, the second pivot pin being positioned between the first and second portions of the second arm;
a resilient member coupled to the second portions of the first and second arms and biased to urge the arms towards each other;
a stop member positioned between the second portions of the arms and engagable with the arms to limit movement of the arms towards each other; and
a transducer engaging the second portions of the first and second arms, the transducer generating an electrical signal representing a distance between the second portions.

2. The draft force sensing system of claim 1, further comprising:
left and right sensing links, each sensing link transmitting draft force from a corresponding draft link to the corresponding first portion.

3. The draft force sensing system of claim 2, wherein:
each sensing link has an adjustable length.

4. The draft force sensing system of claim 2, wherein each sensing link comprises:
a rod having a first end and a second end, the first end being pivotally coupled to the corresponding first portion, and the second end having a threaded bore extending axially therein; and
a threaded bolt which is received by the threaded bore and which has a head to which draft forces are applied.

5. The draft force sensing system of claim 4, wherein each sensing link comprises:
a backup nut is threaded onto the bolt to hold the bolt in a proper position relative to the rod.

6. The draft force sensing system of claim 1, further comprising:
left and right link supports formed on the hitch frame, each link support being coupled to a corresponding one of the left and right draft links;
left and right draft bars, each draft bar having a first portion attached to a corresponding one of the link supports, each draft bar having a second portion positioned rearwardly and inwardly with respect to its first portion, draft forces applied by the draft links to the link supports causing deflection of the second portions of the draft bars, the second portions of the draft bars being coupled to the first portions of the first and second arms.

7. The draft force sensing system of claim 1, wherein:
the first pivot pin divides the first arm into a first shorter portion and a first longer portion, an end of the first longer portion engaging a first end of the transducer; and
the second pivot pin divides the second arm into a second shorter portion and a second longer portion, an end of the second longer portion engaging a second end of the transducer.

8. The draft force sensing system of claim 1, wherein:
the stop member is located between the resilient member and the transducer.

9. The draft force sensing system of claim 2, wherein:
each sensing link extends transversely with respect to a fore-and-aft direction.

10. The draft force sensing system of claim 2, further comprising:
left and right draft bars, each draft bar having a first portion coupled to a corresponding one of the draft links and a second portion coupled to a corresponding one of the sensing links, the second portions disengaging from the sensing links when draft force is less than a threshold.

11. The draft force sensing system of claim 1, wherein:
the second portions of the arms disengage from the transducer when draft force exceeds a threshold.

* * * * *